United States Patent [19]

Peppler

[11] 4,355,596
[45] Oct. 26, 1982

[54] POULTRY FEEDER HAVING SEQUENTIAL CONTROL

[75] Inventor: William Peppler, Decatur, Ala.

[73] Assignee: Chore-Time Equipment, Inc., Milford, Ind.

[21] Appl. No.: 128,271

[22] Filed: Mar. 7, 1980

[51] Int. Cl.³ .................. A01K 5/00; A01K 39/012
[52] U.S. Cl. .................................... 119/18; 119/52 AF
[58] Field of Search ............. 119/18, 51 FS, 52 AF, 119/52 B, 53, 51.11

[56] References Cited

U.S. PATENT DOCUMENTS

| | | | |
|---|---|---|---|
| 2,563,331 | 8/1951 | Hager | 119/52 AF X |
| 3,230,933 | 1/1966 | Myers et al. | 119/53 |
| 3,523,519 | 8/1970 | Hostetler | 119/18 |
| 3,611,995 | 10/1971 | Murto | 119/18 |
| 3,720,185 | 3/1973 | Aldous et al. | 119/51.11 |
| 3,776,191 | 12/1973 | Murto | 119/52 AF X |
| 3,904,082 | 9/1975 | Hostetler | 119/51.11 X |

FOREIGN PATENT DOCUMENTS 967112  8/1964  United Kingdom .................. 119/18

Primary Examiner—Robert Peshock
Assistant Examiner—Robert P. Swiatek
Attorney, Agent, or Firm—Trexler, Bushnell & Wolters, Ltd.

[57] ABSTRACT

There is disclosed a system for conveying feed to a plurality of groups of animals such as poultry. The system includes a feed conveying apparatus associated with each group of animals for conveying feed to each group of animals, a feed supply connected in common to all of the feed conveying apparatus for supplying feed thereto, and a control for sequentially operating the conveying apparatus one at a time. As a result, any number of animal groups may be fed even though the feed supply may have a limited feed supply rate capacity.

11 Claims, 5 Drawing Figures

4,355,596

POULTRY FEEDER HAVING SEQUENTIAL CONTROL

BACKGROUND OF THE INVENTION

The present invention is generally directed to an animal feed system and more particularly to a system for conveying feed to a plurality of animal groups.

Many animals, such as poultry for example, are fed at periodic intervals. In some modern poultry raising operations, the birds are kept in cages arranged in rows within an enclosed poultry house. To provide feed to the caged and relatively immobilized birds, an efficient and automatic feeding system is required. One such automatic bird feeding system is disclosed in U.S. Pat. No. 3,611,995 wherein a plurality of feeder lines are disposed adjacent to the individual cage rows. Each feeder line includes an elongated trough structure in which the feed is deposited for consumption by the flock. Feed may be distributed along this trough by a channelized conveyor of a generally tubular construction. Rotation of an auger member causes the feed to be moved along the conveyor line and to be distributed through a series of holes formed in the channel member. The flights of the auger may be formed in either a right hand or left hand spiral, depending upon the direction of rotation of the auger drive and the direction in which the feed is intended to be moved.

The cages for the birds are arranged in tiered rows with the rows being closely adjacent to form a single group or flock to be fed. Each row is associated with a feeder line and all of the feeder lines are connected in common to a feed supply line. In operation of such prior art system, the feeder lines are energized together and the supply line is then energized. After the group or flock of birds has been fed, the supply line is first de-energized and then the feeder lines are de-energized.

While such systems have been generally successful in automating the feeding of poultry, their capacity has been limited in terms of the number of birds which could be fed. Only one group or flock of birds could be accommodated because of the inherent finite capacity of the feed supply line. Additional groups of birds could not be fed in the foregoing manner because the supply line would not be able to provide the required volume of feed to each feeder line. Either additional supply lines have to be provided or the existent supply line would have to be made exorbitantly large. Both solutions are costly or difficult to implement.

It is therefore a general object of the present invention to provide a new and improved system for feeding animals such as poultry.

It is a specific object of the present invention to provide a feed system which is capable of conveying feed to any number of poultry groups while utilizing a single feed supply line.

It is a more specific object of the present invention to provide such a system which includes feed conveying means associated with each poultry group, wherein the feed conveying means are connected in common to the feed supply line and sequentially operated by control means one at a time.

The present invention therefore provides a system for conveying feed to a plurality of groups of animals. The system includes feed conveying means associated with each group of animals for conveying feed to each group, feed supply means connected in common to all of the feed conveying means for supplying feed to the feed conveying means, and control means for sequentially operating the feed conveying means so that only one feed conveying means is operative at a time.

BRIEF DESCRIPTION OF THE DRAWINGS

The features of the present invention which are believed to be novel are set forth with particularity in the appended claims. The invention, together with the further objects and advantages thereof, may best be understood by making reference to the following description taken in conjunction with the accompanying drawings, and the several figures of which like reference numerals identify identical elements, and wherein:

DESCRIPTION OF THE PREFERRED EMBODIMENT

Figure 1:
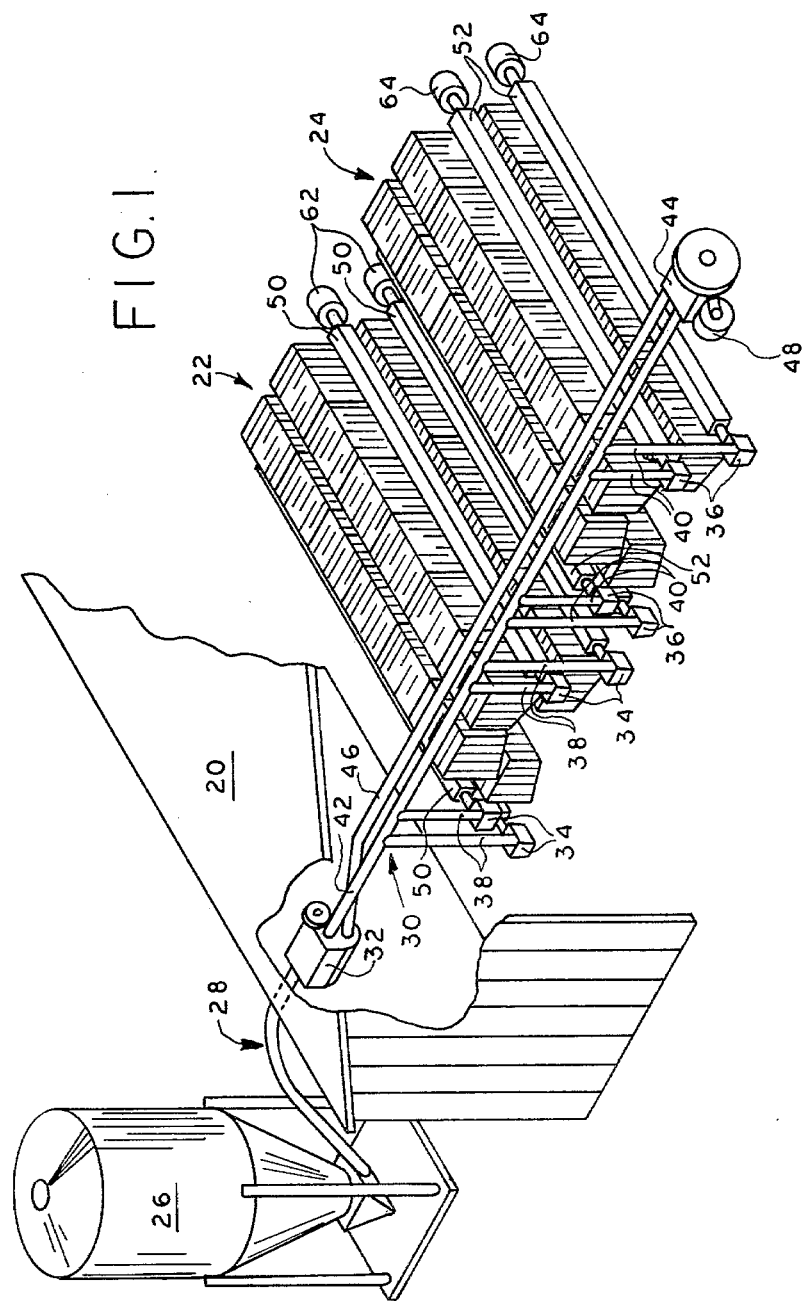
FIG. 1 is a general perspective view showing a poultry feeding system embodying the present invention installed in a typical poultry house.

Referring now to FIG. 1, there is shown a feeding system utilizing the present invention inside a poultry house (20) containing first and second groups of cages (22) and (24) arranged to confine therein respective first and second groups or flocks of poultry to be fed. While the preferred embodiment herein is directed to a feed system for feeding two groups or flocks of poultry, as will be apparent hereinafter, any number of groups or flocks may be fed in accordance with the present invention.

The cages (22) and (24) are of known construction and arranged in rows within the house (20) with each cage being sized to accommodate one or more birds. Feed for the caged birds is stored in a bulk storage bin (26) which may be conveniently located outside of the house (20). The feed is introduced into the house by a main conveyor (28), which may include a flexible tube and auger, and is distributed through a feed supply means (30) including a shunt hopper (32), a first plurality of line hoppers (34), a second plurality of line hoppers (36), a first plurality of drop tubes or conduits (38), a second plurality of drop tubes or conduits (40), and a header conveyor (42). The feed is distributed through the shunt hopper (32) to the line hoppers (34) and (36) by the header conveyor (42) and the associated drop tubes (38) and (40). To avoid waste of feed, excess feed which is not distributed to the line hoppers (34) and (36) is delivered to a return box (44) mounted at the downstream end of the header conveyor (42). This excess feed is re-routed by a return line (46) to the shunt hopper (32). For operating the main conveyor (28) and the header conveyor (42), a motor (48) is provided.

Figure 2:
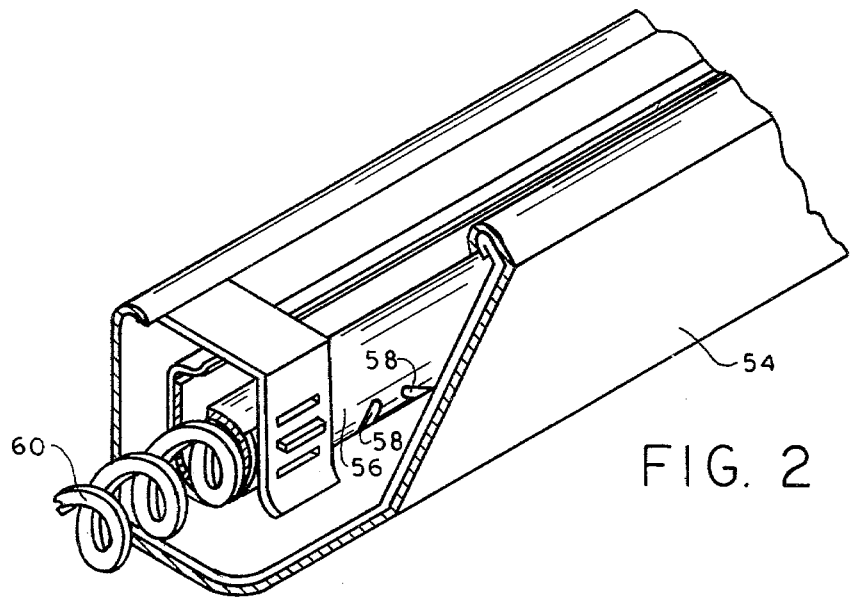
FIG. 2 is a partial perspective view illustrating a preferred feed conveyor means.

For distributing the feed to the respective bird groups, each of the groups is associated with a feed conveying means comprising a first plurality of channelized conveyors (50) and a second plurality channelized conveyors (52) respectively. As may be noted in FIG. 2, the channelized conveyors take the form of a trough (54) having disposed therein throughout its substantial entire length a U-shaped channel (56). The channel (56) includes a plurality of slots (58) through which the feed is dispensed into the trough (54). The feed is carried to the slot (58) by an auger (60). For further details with respect to the construction and operation of the channelized conveyors, reference may be had to U.S. Pat. No. 3,776,191.

Each of the augers of the channelized conveyors (50) and (52) are operated by first and second plurality of electric motors (62) and (64). The motors (62) and (64) are arranged to rotate the augers when energized by a control means to be described hereinafter.

As thus far described, the system operates in the following manner for feeding the birds. The control means includes a time clock which includes a pair of contacts. When the contacts close, the first set of motors (62) are energized. The energization of the motors (62) then causes the feed supply motor (48) to be energized. As will be explained subsequently, the feed supply could include a separate motor for each of the main conveyor (28), the header conveyor (42), and the return line (46) and all of these motors would be energized simultaneously to permit feed to be delivered from the storage bin (26) to the drop tubes (38) and line hoppers (34).

Feed is now distributed along the first set of channelized conveyors (50) for feeding the first group of birds in cages (22). After the birds in cages (22) have received a sufficient quantity of feed, the first set of motors (62) are de-energized. When the first set of motors (62) are de-energized, the current monitor, senses the interruption in current and de-energizes the motor (48) or motors of the feed supply.

A time delay relay within the control means allows the second set of motors (64) to be energized. When the second set of motors (64) is energized the control means once again energizes the motor (48) or motors of the feed supply. Hence, feed is now distributed from the storage bin (26) to the second set of drop tubes (40) and line hoppers (36) and along the second set of channelized conveyors (52) to the second group of birds in cages (24).

When feeding of second group of birds has been completed, the second set of motors (64) is de-energized and the control means current monitor once again de-energizes the feed supply motor (48) or motors. Both groups of birds have now been fed and the system is re-set for the next feeding.

It may be noted that additional groups of birds could also be fed in the same manner. Because each group of birds is fed sequentially and one at a time, any number of bird groups may be fed by practicing the present invention without having to increase the capacity of the feed supply.

Figure 3:
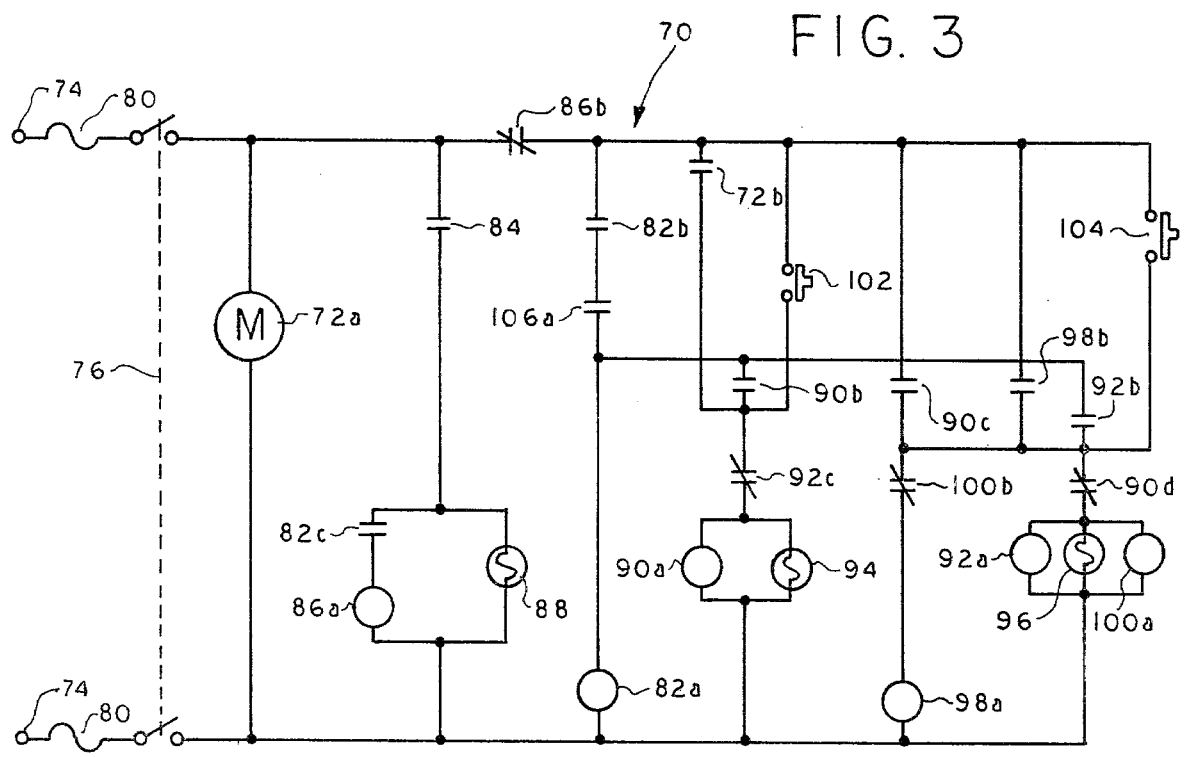
FIG. 3 is a schematic circuit diagram of a control means for controlling the operation of the feed system in accordance with the present invention.
Figure 5:
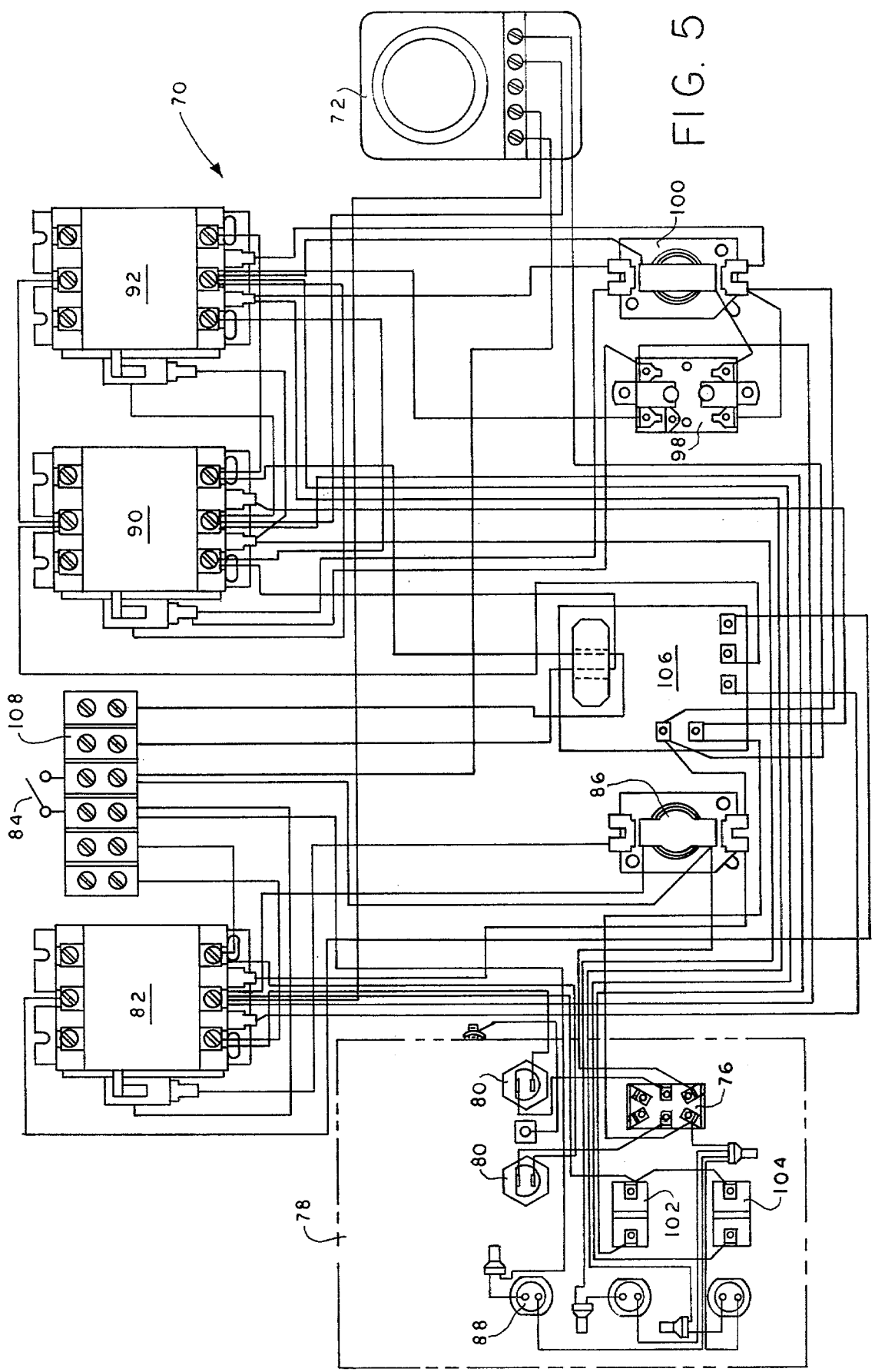
FIG. 5 is a wiring diagram of a control means wired in accordance with the schematic circuit diagram of FIG. 3.

The control means previously referred to is illustrated in schematic circuit diagram form in FIG. 3 and in wiring diagrammatic form in FIG. 5. The control means (70) includes a time clock (72) having a motor (72a) coupled across a pair of fused power terminals (74) through a switch (76) of a power service panel (78). The fuses (80) are coupled between the switch (76) and the terminals (74) as shown. The time clock (72) also includes a pair of normally opened contacts (72b).

The control means also includes a feed supply contactor (82) comprising a coil (82a), a pair of normally opened main pole contacts (82b), and a pair of normally opened auxiliary contacts (82c). The contacts (82c) form a portion of a detector which detects when the supply bin (26) (FIG. 1) is empty. This detector includes a normally opened bin switch (84), a time delay relay (86) having a coil (86a) and a pair of normally closed contacts (86b), and a warning light (88). If the storage bin (26) (FIG. 1) should be empty at a time when the birds are to be fed, the normally opened switch (84) will close. As can be seen in the circuit diagram, when the switch (84) closes, power is applied to the warning light (88). Furthermore, when the control means (70) attempts to actuate the feed supply of the system, the auxiliary contacts (82c) will close to apply current to the coil (86a). When current is applied to the coil (86a), the normally closed contacts (86b) will open to disconnect the control means from the power current applied to the terminals (74). As a result, further energization of the system is precluded until an adequate supply of feed is administered to the storage bin (26).

The control means (70) further includes a pair of contactors for energizing the respective first and second sets of motors (62) and (64) (FIG. 1). Associated with the first set of motors (62) is a first contactor (90) having a coil (90a), a pair of normally opened main pole contacts (90b), a pair of normally opened auxiliary contacts (90c), and a pair of normally closed auxiliary contacts (90d). Similarly, associated with the second group of motors (64) (FIG. 1) is a second contactor (92) having a coil (92a), a pair of normally opened main pole contacts (92b) and a pair of normally closed auxiliary contacts (92c). To provide a visual verification when the first and second groups of motors are operative, a first indicator light (94) is coupled across the first contactor coil (90a), and a second indicator light (96) is coupled across the second contactor coil (92a). Hence, when the first set of motors (62) is energized, light (94) will emit light, and when the second set of motors (64) is energized, the second light (96) will emit light.

The control means (70) further includes a sequence relay (98) having a coil (98a) and a pair of normally opened contacts (98b) and a second time delay relay (100) having a coil (100a) and a pair of normally closed contacts (100b). In order to provide manual actuation of either the first or second set of motors, the control means (70) includes a first manual control switch (102) and a second manual control switch (104). Lastly, for sensing the flow of current through the first and second contactor coils (90a) and (92a) there is provided a detector means in the form of a current monitor (106) having a pair of normally opened contacts (106a). The current monitor may include an induction pick-up coil for sensing the flow of current and for producing a control voltage for activating a silicon control rectifier. Other forms of current monitors are also known in the prior art which may be utilized in practicing the present invention.

Figure 4:
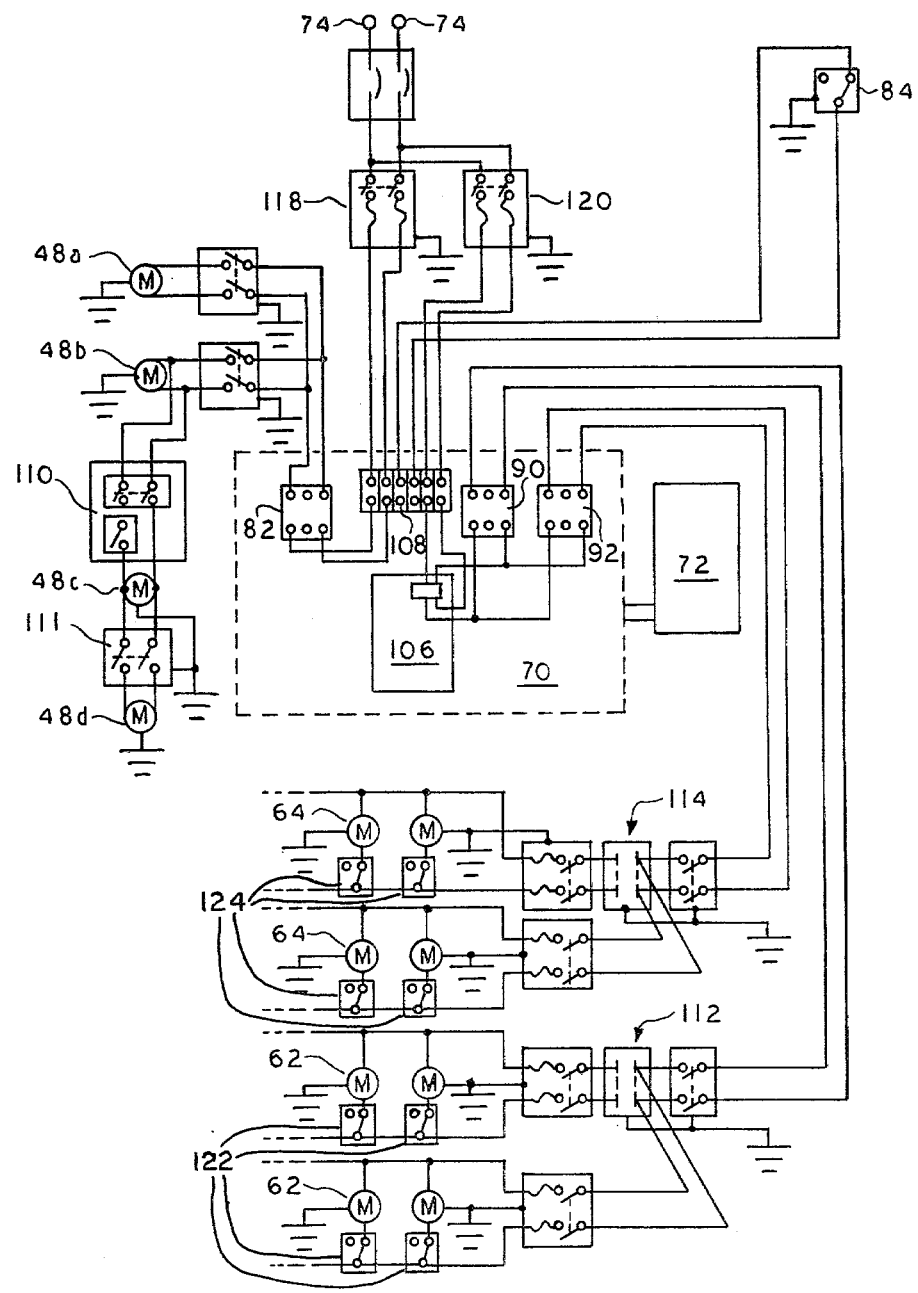
FIG. 4 is an electrical circuit diagram of the feed system of the present invention with the circuit of FIG. 3 included therein in general schematic form.

The control means of FIGS. 3 and 5 is interfaced with the total system as shown in the schematic diagram of FIG. 4. There, it may be seen that the feed supply contactor (82) is coupled to the power terminals (74) through a terminal block (108) and switch (118) and to motors (48a) and (48b) for energizing the same. Motor (48a) may, for example, be utilized for powering the header conveyor (42) (FIG. 1) and motor (48b) may be utilized for powering the return line (46). Also, the contactor (82) is further coupled to a motor (48c) which is coupled across the motor (48b) by a control switch (110). Motor (48c) may, for example, be utilized for powering the main supply line (28) (FIG. 1). Additionally, an auxiliary motor (48d) may be energized through a control switch (111).

As may be further noted in FIG. 4, the first contactor (90) is coupled to the power terminals (74) through the current monitor (106) and switch (120) and to the first set of motors (62) through a control switch system (112) for energizing the motors (62). The second contactor (92) is similarly coupled to the power terminals (74) through the current monitor (106) and switch (120) and to the second set of motors (64) through another control switch system (114). As may be further noted from FIG. 4, the bin switch (84) is shown to be external to the control means (70) because it is preferably located at the storage bin (26) for sensing when the storage bin (26) is empty. Lastly, the time clock (72) is coupled to the control means (70) as previously indicated in FIGS. 3 and 5.

In operation, when it is time for the birds to be fed, the time clock whose motor (72a) is coupled across the power terminals (74) will cause its normally opened contacts (72b) to close. Power will then be applied through the normally closed contacts (92c) to the first contactor coil (90a) for energizing the first contactor (90). When the first contactor (90) is energized, its associated first set of motors (62) will be energized to cause the first channelized conveyors (50) to operate. Also, the normally opened contacts (90b) will close to apply energizing current to the feed supply contactor coil (82a). As a result, the feed supply motors (48a), (48b), and (48c) will operate to permit the supply of feed to the first set of line hoppers (34) through the first set of drop tubes (38). Hence, feeding of the first group of birds in cages (22) has begun.

Also, with the energization of the first contactor coil (90a) and the feed supply contactor coil (82a), the normally opened contacts (90c) will close and the normally closed contacts (90d) will open to prevent any power from reaching the second contactor coil (92a) at this time. Also, with the energization of the feed supply contactor coil (82a), the normally opened contacts (82b) will close. Because the first group of motors (62) have been energized, the current monitor normally opened contacts (106a) will close.

As the first group of birds are being fed, the contacts (90c) will be closed in view of the energization of the first contactor (90). This provides current to the sequence relay coil (98a) through the normally closed contacts (100b) of the second contactor (92).

When the feeding of the first group of birds has been completed, all of a plurality of switches (122), associated with the respective motors (62), will be open to interrupt the supply of current to the first group of motors (62). When this occurs, the first set of motors (62) will be de-energized. These switches (122) are actuated by suitable feed level sensors such as diaphragms (not shown), in accordance with the aforementioned U.S. Pat. No. 3,611,995, to de-energize a given motor (62) when the feed at an end part of the associated trough (54) reaches a predetermined level. Upon sensing the termination of the current to the first group of motors (62), the current monitor will open its contacts (106a) to interrupt the supply of current to the feed supply contactor coil (82a). As a result, the contacts (82b) will open.

Also, as the first contactor (90) is de-energized, the normally closed contacts (90d) will close. Even though the contacts (90c) will open, the sequence relay (98) will hold its contacts (98b) closed to provide the flow of current to the second contactor coil (92a). Upon receiving current, the second contactor (92) will energize the second set of motors (64) to operate the second set of channelized conveyors (52).

Also, when the second contactor coil (92a) is energized, its main pole contacts (92b) will close to provide current to the feed supply contactor (82) to cause it to energize the feed supply. As a result, feed will be supplied from the storage bin (26) to the second set of line hoppers (36) through the second set of drop tubes (40). The second group of birds within cages (24) will then be fed as the feed is supplied to them through the channelized conveyor (52).

Upon sensing the current supplied to the second set of motors (64), the current monitor contacts (106a) will close. Because the feed supply contactor contacts (82b) have already closed upon the energization of the feed supply contactor (82), current will be supplied directly to the feed supply contactor coil (82a) for maintaining feed supply within the system.

When current was applied to the second contactor coil (92a), current was also supplied to the second sequence relay coil (100a). As a result, the second time delay relay contacts (100b) will open to de-energize the sequence relay coil (98a). However, since the second contactor contacts (92b) are closed, current will be maintained to the second contactor coil (92a) through the contacts (82b) and (106a) to maintain the operation of the second set of motors (64).

When feeding of the second set of birds has been completed, all of a second set of feed level sensor-actuated switches 124 will be open to de-energize the associated ones of the second group of motors 64. When this occurs, the second set of motors (64), are de-energized. Upon the de-energization of the second motors (64), the current monitor contacts (106a) will open to de-energize the feed supply contactor (82). As a result, both the second set of motors (64) and the feed supply motors (48a), (48b), and (48c) will be de-energized to terminate the feeding of the birds. In this condition, the system is also re-set for the initiation of another feeding cycle by the time clock.

From the foregoing, it can be seen that the present invention provides a new and improved animal feed system and more particularly a new and improved system for conveying feed to a plurality of groups of animals such as poultry. Because each group of birds is fed sequentially and one at a time, the feed supply capacity need not be increased, and in fact, may have a capacity only sufficient to supply feed to the individual feed conveying means comprising the drop tubes, line hoppers and channelized conveyors associated with the respective groups of birds. However, it is preferable that the feed supply means have a feed supply rate which is at least equal to or slightly greater than the individual feed conveying rates of the feed conveying means. Hence, any number of poultry groups may be fed in accordance with the present invention without requiring major overhaul of an existing feed supply system.

While a particular embodiment of the present invention has been shown and described, modifications may be made, and it is therefore intended to cover in the appended claims all such changes and modifications which fall within the true spirit and scope of the invention.

The invention is claimed as follows:

1. A poultry feed system for conveying feed to plural groups of poultry comprising: a plurality of feed conveying means, each said feed conveying means being arranged to convey feed to a respective given one of said poultry groups; feed supply means common to all said feed conveying means for supplying feed to said feed conveying means, said feed supply means having a rate of feed supply which is less than the combined rate of feed conveyance of said plurality of feed conveying means; and automatic control means for automatically actuating each said feed conveying means individually and in succession for causing each said feed conveying means to convey feed from said feed supply means to its respective poultry group and to assure an adequate supply rate of feed to each said feed conveying means, wherein said control means is arranged for actuating said supply means subsequent to actuating a first one of said feed conveying means and for deactuating said supply means before the actuation of each successive feed conveying means.

2. A poultry feed system as defined in claim 1 wherein said rate of feed supply of said feed supply means is equal to or greater than the individual rate of feed conveyance of any of said feed conveying means.

3. A system as defined in claim 1 further comprising a source of feed, wherein said feed supply means comprises a supply line coupled to said source of feed and extending to each said feed conveying means and a plurality of conduits, each conduit coupling said feed supply line to one of said feed conveying means.

4. A system as defined in claim 3 wherein said feed supply means further includes a shunt hopper at an intake end of said supply line, return means at an end of said supply line opposite said intake end, and a return line coupled between said return means and said shunt hopper for returning excess feed to said shunt hopper for providing a continuous flow of feed to said conduits.

5. A system as defined in claim 1 wherein each said feed conveying means comprises a plurality of auger conveyors and a motor for driving each said auger conveyor, and wherein said control means is arranged to actuate the auger motors of each said feed conveying means in unison.

6. A system for conveying feed to a plurality of groups of animals comprising: a plurality of feed conveying means associated with each group of animals for conveying feed to each said group; feed supply means connected in common to all said feed conveying means for supplying feed to said feed conveying means; and control means for automatically sequentially operating said feed conveying means so that fewer than all of said feed conveying means are operative at a time and wherein said control means is arranged to interrupt the operation of said feed supply means between the sequential operations of said feed conveying means.

7. A system as defined in claim 6 wherein said feed supply means includes a source of feed, an auger conveyor means, and return means for returning excess feed to said auger conveyor means.

8. A system as defined in claim 6 wherein each said feed conveying means includes motor means for driving said feed conveying means, said motor means being sequentially actuated by said control means for sequentially operating the associated conveying means, and wherein said control means further includes detector means for interrupting the operation of said feed supply means when said actuated motor means ceases operation, before actuating the next motor means in sequence.

9. A system as defined in claim 8 wherein each said motor means comprises an electric motor powered by an electric current when operative, and wherein said detector means comprises a current monitor.

10. A system for conveying feed to a plurality of groups of animals comprising: a plurality of feed conveying means arranged in groups, each group including at least one feed conveyor and motor means for driving said at least one feed conveyor, a single feed supply means for supplying feed to all of said feed conveying means, and automatic control means for automatically actuating the motor means for driving each of said groups of feed conveying means individually and in a predetermined sequence, and wherein said feed conveying means includes trough means associated with each feed conveyor for receiving the feed therefrom, sensor switch means for sensing the feed level in each trough means and for de-energizing an actuated motor means when the feed level in the associated trough means reaches a predetermined level, and further including detector means for detecting de-energization of an actuated motor means and responsive thereto for interrupting the operation of said feed supply means before actuating the next motor means in sequence.

11. A system as defined in claim 10 wherein said control means further includes timing means for initiating the actuation of a first in said sequence of motor means and resetting means for resetting the control means for response to further actuation in response to said timing means when all of said motor means have been actuated and de-energized in sequence.

* * * * *